(12) United States Patent
Laul

(10) Patent No.: US 7,008,276 B1
(45) Date of Patent: Mar. 7, 2006

(54) PROPULSION SYSTEM

(76) Inventor: Virgil R. Laul, 105 Schubert Ct., Irvine, CA (US) 92612

( * ) Notice: Subject to any disclaimer, the term of this patent is extended or adjusted under 35 U.S.C. 154(b) by 0 days.

(21) Appl. No.: 10/671,145

(22) Filed: Sep. 24, 2003

Related U.S. Application Data

(60) Provisional application No. 60/413,480, filed on Sep. 26, 2002.

(51) Int. Cl.
  *B63H 1/30* (2006.01)
(52) U.S. Cl. .......................... 440/13; 74/845; 244/172
(58) Field of Classification Search .................. 440/13; 244/172
  See application file for complete search history.

(56) References Cited

U.S. PATENT DOCUMENTS

| | | | | |
|---|---|---|---|---|
| 2,886,976 A | * | 5/1959 | Dean | ........................... 74/112 |
| 3,266,233 A | * | 8/1966 | Farrall | ........................... 477/16 |
| 4,242,918 A | * | 1/1981 | Srogi | ........................... 74/84 S |
| 5,831,354 A | * | 11/1998 | Stopplecamp | ................ 310/12 |

* cited by examiner

*Primary Examiner*—Jesus D. Sotelo

(57) ABSTRACT

A propulsion system which is designed to be used on a payload platform such as a spacecraft, satellite, aircraft or ocean vessel. To operate the system, electrical power is required. However, during operation the system does not require fuel or mass to be expelled into the environment in order to move in space. The system is designed to operate in two operational modes: in mode 1 the system incrementally moves the payload platform forward with each operational cycle. In the first mode, the system starts out with zero momentum and after moving a small distance is again left with zero momentum. In the mode 2 operation the payload platform accelerates forward a discrete increment of velocity during each operational cycle. In this second mode of operation these increments of velocity are additive.

14 Claims, 6 Drawing Sheets

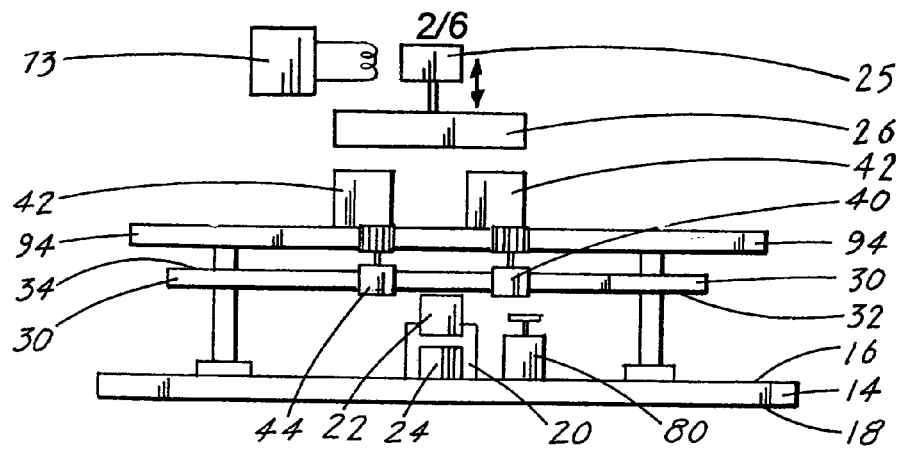
*Fig. 4*
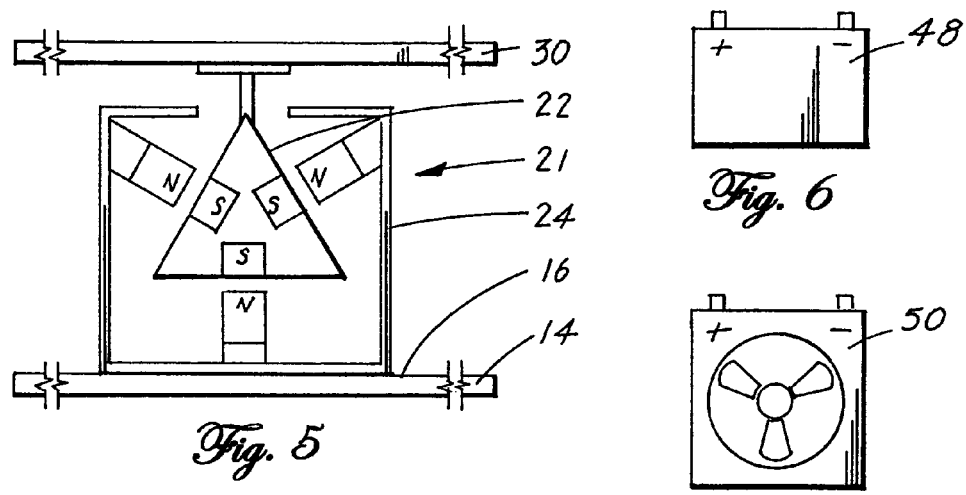
*Fig. 5*
*Fig. 6*
*Fig. 7*
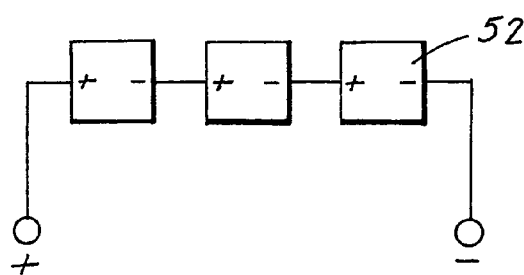
*Fig. 8*
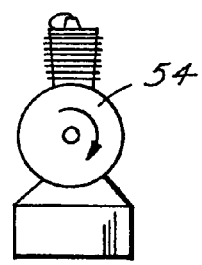
*Fig. 9*

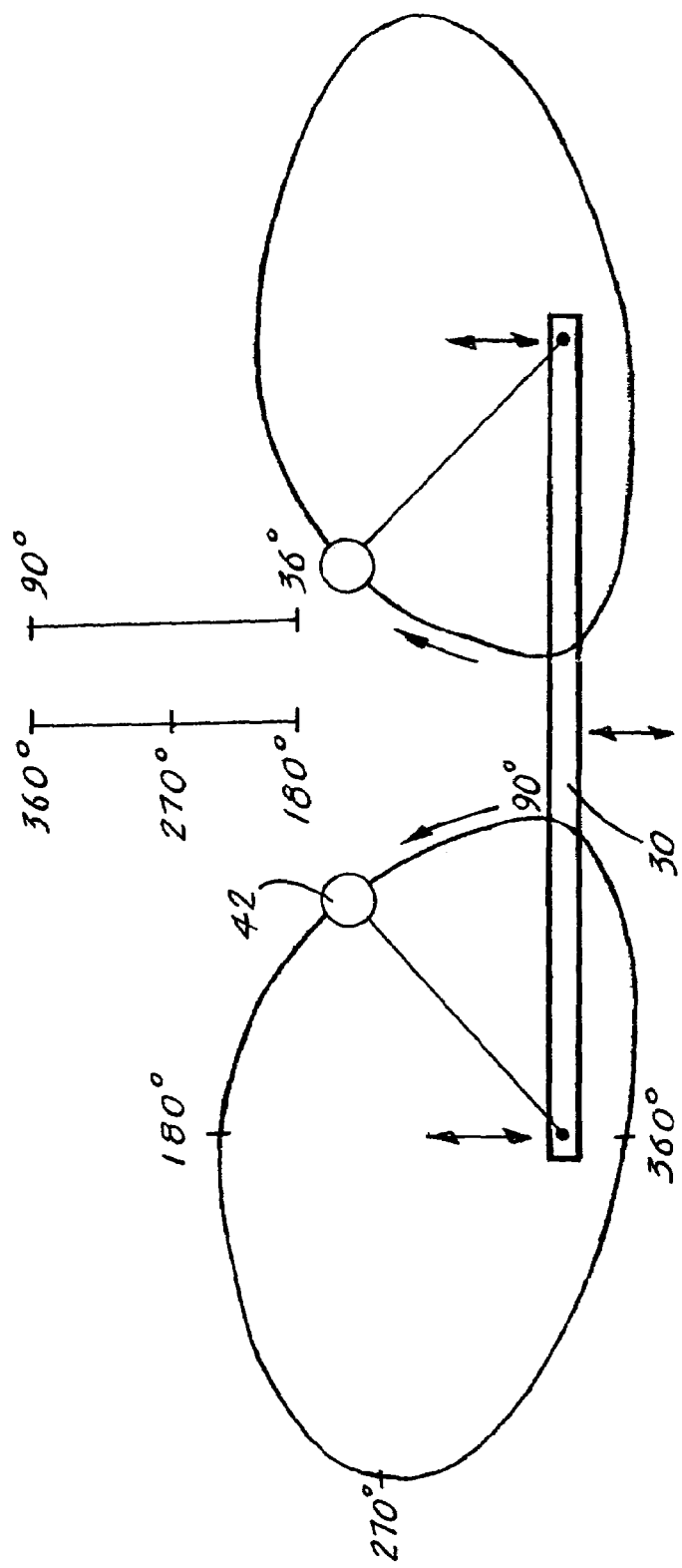
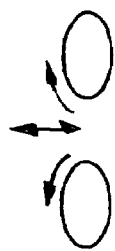
Fig. 10
Fig. 10A

PROPULSION SYSTEM

This application claims priority of Provisional Patent Application No. 60/413,480 filed Sep. 26, 2002.

TECHNICAL FIELD

The invention pertains to propulsion systems in general, and more particularly to a propulsion system for moving objects through space.

BACKGROUND ART

Airplanes, spacecraft and motorized boats all expel material away from themselves in order to travel forward. In the case of a boat, water is expelled backwards, and in the case of a plane, air is pushed backwards. This is also true of spacecraft and satellites that travel outside the atmosphere when they change orbit or orientation. The major limitation is that spacecraft can only carry a limited amount of fuel with which to accelerate or change direction. This invention addresses this problem. No material is expelled in the opposite direction of travel of the system. A source of power is required to operate this new propulsion system. Newton is piecemeal conserved but discontinuities occur when the system is redefined periodically by engaging other parts or masses of the system as the system operates. The proper conditions can be produced by the system to move a vehicle forward or backward in space, water, or on the ground without expelling any matter to the outside. The system has been reduced to practice as described infra and additionally has been extensively tested on an air table for proper operation.

DISCLOSURE OF THE INVENTION

The system is based on the principle that an equal and opposite force is produced when an unbalanced weight is rotated. This force or motion causes the system to rotate about its center of mass and thus traverse a circular path in space. Two such weights are mounted on a carriage plate and are rotated in synchrony in opposite directions by two drive motors in order to cancel lateral forces. The carriage plate that carries the counter-rotating weights is mounted on a linear slide, so when the weights rotate, the carriage plate moves back and forth on the slide. The distance that this carriage moves on the linear slide is determined by the ratio of the weight of the weights to the weight of the slide, and the length of the coupling arms of the weights. This mechanism it will only reciprocate back and forth on the linear slide as the weights rotate, it is not yet a propulsion system. In order for this mechanism to perform as a propulsion system, the reciprocating motion of the carriage on the slide has to be selectively timed and coupled to the base of the unit that the slide is mounted on. The slide is mounted on the base and this base can also be the vehicle that is moved forward. In order to move forward, the base requires an additional element or device that periodically couples the motion of the carriage to the base and thus moves the base. The device that is used to accomplish this is an electric solenoid, which is mounted to the base. When the solenoid is activated the solenoid plunger engages the slide during a pre-determined point on its travel on the slide and thus couples the slide solidly to the base from 130 degees–50 degrees and uncouples the base at 180 degrees. Since the slide is in motion this motion is coupled to the base. The coupling and uncoupling points and timing are crucial to the proper operation of this device. The system starts out with zero momentum or no motion forward. After one complete cycle the propulsion system has moved forward some amount, for example one inch. The base is again stopped with no forward momentum. Then the weights are again in their initial position and are ready to repeat the cycle. The base of this system is again stopped with zero forward momentum.

The weights continue to rotate and the carriage continues its back and forth motion on the slide. This is true of the first mode of operation. In the second mode of operation an increment of velocity is added to the device that the propulsion system is mounted on during each cycle. Let us examine the operation of the basic motive mechanism. One complete cycle of the mode 1 operation consists of one complete rotation of the weights. FIG. 10 is the actual representation of the paths of the weights. The power or forward cycle begins at 50 degrees to 130 degrees and ends at 180 degrees. The power cycle may start earlier, depending on the velocity of the weights and their kinetic energy in relation to the kinetic energy of the slide. During this time the carriage is locked to the base, so if the weight goes forward the carriage and base move in the opposite direction. Since the carriage and base are locked together they constitute one mass. The weights constitute the other mass. The equal and opposite momentum of these two masses cancel at 180 degrees and the base stops in space. The weights however continue to rotate. The carriage and weights are now only acting against each other, so the motion of each is proportional to the other. There is a non-symmetric condition created when the solenoid combines the weights of the base and the carriage. Symmetric rotation is no longer true. The weights have constant rotary motion in relation to the carriage and certain inertia. The carriage however must stop, since it is traveling back and forth. Notice the distance that the carriage has traveled while the weight traveled from 180 degrees to 270 degrees. This distance traveled by the carriage from 270 to 360 degree travel by the weights is close or the same as in the previous segment of travel from 180 to 270 degrees. At 180 degrees the carriage is at its most rearward travel and must reverse direction. This means that the carriage at that point has no momentum. The weights are at 360 degrees and were constrained to proportional travel during the previous segments. At 360 degrees the weight is acting against the carriage (at 360 degrees the carriage is stopped) that now has no kinetic energy. This enables the weights, due to their forward momentum, to take a more tangential path to their normal orbital path. In other words, the weights are able to drag the carriage along due to their kinetic energy and momentum. Notice that the distance that the carriage traveled from 360 degrees back to 90 degrees is twice that of the previous segment. This disproportionate travel of the carriage from 360 to 90 degrees enables the propulsion system to reset itself to initial conditions and repeat the next cycle.

The second mode of operation (this mode enables the system to accelerate additively each time it is engaged) also takes advantage of this new non-symmetric behavior. The method to accomplish the mode 2 operation is to couple the slide to the base and also couple the base to the body to be accelerated. The degree of coupling to the third body can be varied. The engagement of the second mode of operation may cause the carriage and the weights to change their position in relation to the base. The consequence is that you run out of slide. In other words, the carriage and weights are on the rear position of the slide. This action may require engaging the mode one operation and or repositioning the carriage and weight assembly by a servo mechanism that re-synchronizes the parts to their proper position in relation to the base, and their position on the third body that is being accelerated and is now in motion.

One complete cycle of the mode 1 operation consists of one complete rotation; of the weights. The propulsion unit only moves forward during 90 degrees of rotation, the remaining degrees of rotation are used to reset the system back to initial conditions. FIG. 10 is the actual representation of the paths of the weights in reference to the base. The power or forward cycle begins at 50 degrees to 130 degrees and ends at 180 degrees. During this time the carriage is locked to the base, so if the weights go forward and the carriage and base move in the opposite direction, since the carriage and base are locked together they constitute one mass. The weights constitute the other mass. The equal and opposite momentum of these two masses cancel at 180 degrees and the base stops in space. The carriage is uncoupled from the base at this point. The weights however continue to rotate. The carriage and weights are now only acting against each other, so the motion of each is proportional to the other.

There is a non-symmetric condition created when the solenoid combines the weights of the base and the carriage because the ratio of the interacting masses has changed and also the center of mass, since the masses interacting are now different. The weights have a constant rotary motion, so the weights have a certain fixed inertia. The carriage however must stop momentarily at 180 and 360 degrees since it is traveling back and forth, therefore the carriage has variable inertia. Notice the distance that the carriage has traveled while the weight traveled from 180 degrees to 270 degrees. This distance traveled by the carriage from 270 to 360 degree travel by the weights is close or the same as in the previous segment of travel from 180 to 270 degrees. At 180 degrees the carriage is at its most rearward travel and must reverse direction. This means that the carriage at that point has no momentum. The weights are at 360 degrees and were constrained to proportional travel during the previous segments. At 360 degrees the weights are acting against the carriage that now has no kinetic energy. This frees or enables the weights to take a more tangential path to their normal orbital paths. In other words, the weights are able to drag the carriage along due to their kinetic energy and momentum. Notice that the distance that the carriage traveled from 360 degrees back to 90 degrees is twice that of the previous segment.

This mechanism enables the propulsion system to reset itself to initial conditions and repeat the next cycle. If the speed of rotation of the weights is increased the kinetic energy of the weights is also increased. This enables the carriage to reach its initial condition before the weights reach 90 degrees. This makes it possible to increase the size of the power cycle.

This second mode of operation also utilizes this behavior. The second mode of operation enables the acceleration of the third body, which could be a spacecraft. By proper timing of the coupling to the third body this body can be accelerated an additional increment each time that this is done. These increases in acceleration are additive.

BRIEF DESCRIPTION OF THE DRAWINGS

FIG. 4 is an elevational end view of FIG. 2.

FIG. 5 is an end view of a magnetically levitating constraining assembly.

FIG. 6 is a block diagram of a rechargeable battery.

FIG. 7 is a block diagram of a nuclear battery.

FIG. 8 is a block diagram of a plurality of photovoltaic cells.

FIG. 9 is a schematic diagram of an internal combustion engine.

FIG. 10 is the picture of the weight travel in the mode 1 operation.

BEST MODE FOR CARRYING OUT THE INVENTION

Figure 1:
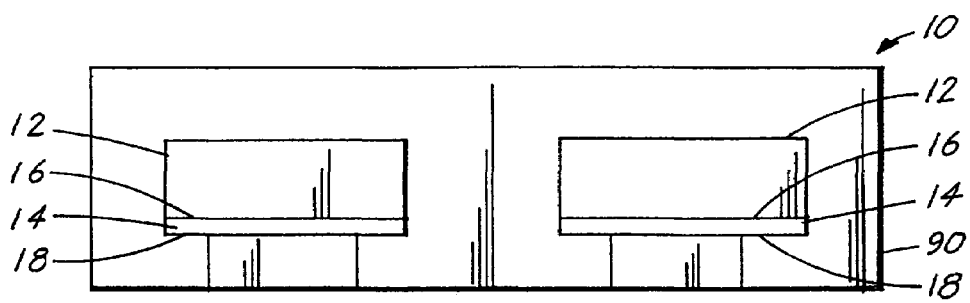
FIG. 1 is a side elevational view of the propulsion system mounted within a payload platform.
Figure 2:
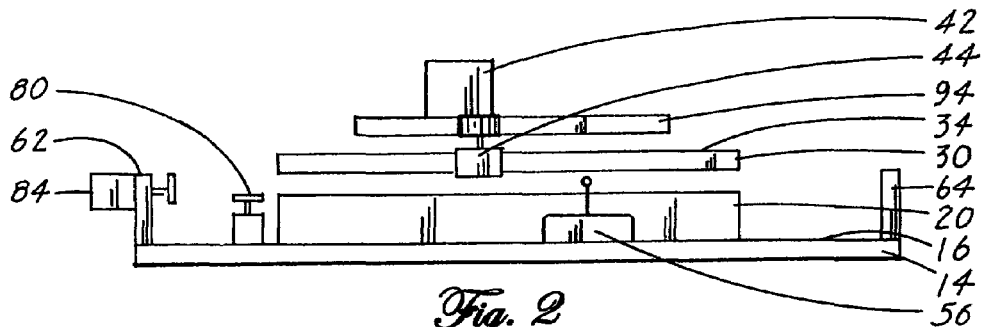
FIG. 2 is aside elevational view of the propulsion unit.
Figure 3:
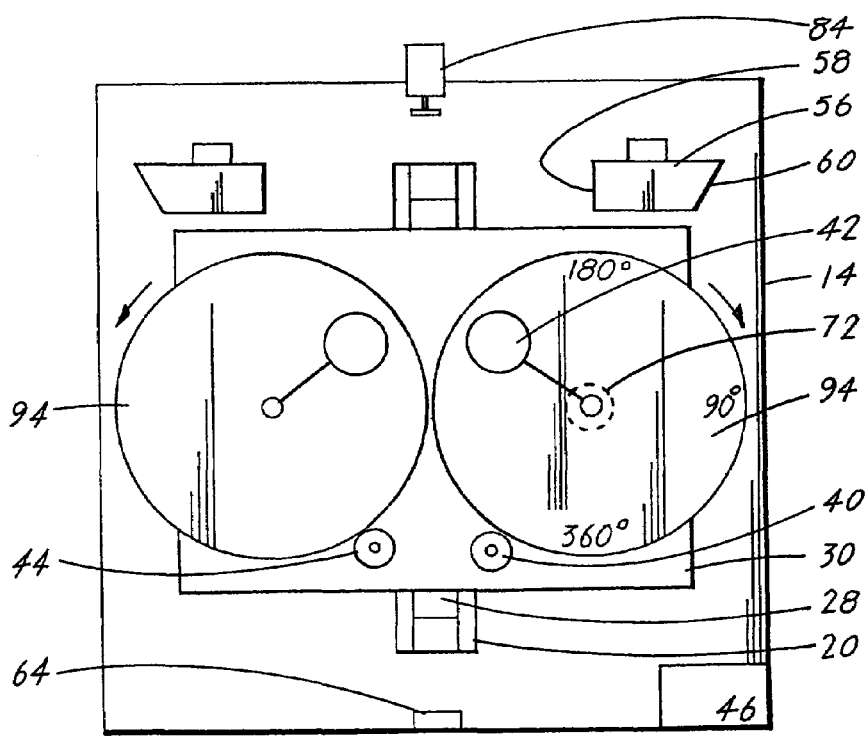
FIG. 3 is a top plan view of FIG. 2.
Figure 11:
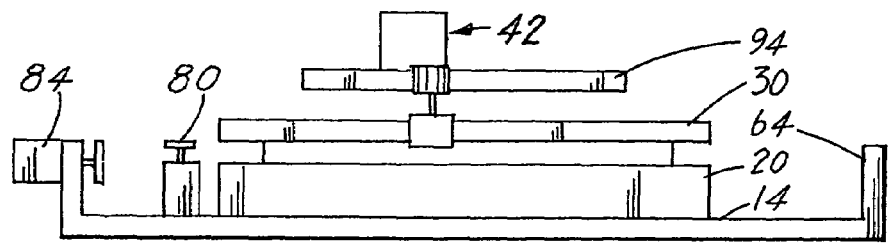
FIG. 11 is a side elevational view.

The best mode for carrying out the invention is presented in terms of a preferred embodiment which is described in two operational modes: a mode 1 and a mode 2. In each of these modes the propulsion unit controls the attitude and or propulsion of a payload platform. The preferred embodiment, as shown in FIGS. 1–17, is comprised of two major elements: a propulsion unit 12 and a payload platform 90, as shown in FIG. 1. The propulsion unit 12 is further comprised of the following major elements: a base 14, a carriage constraining assembly 20, a carriage 30, a pair of counterbalanced weights 42, a motor 40 and a power source 46. The base 14, as shown in FIGS. 2, 3 and 4, consists of an upper surface 16 and a lower surface 18. The lower surface 18 of the base 14 is designed to be rigidly attached to the payload platform 90. The carriage constraining assembly 20 includes an upper movable section 22 and a lower stationary section 24. The lower stationary section 24 is rigidly attached to the upper surface 16 of the base 14, as also shown in FIGS. 2, 3 and 4. The carriage constraining assembly 20 can consist of a linear slide assembly 28, as shown in FIGS. 2, 3 and 4, or a magnetically levitating constraining assembly 21, as shown in FIG. 5. The linear slide assembly 28 also includes an upper movable section 22 and a lower stationary section 24.

The upper movable section 22 of the carriage constraining assembly 20 is attached to the lower surface 32 of the carriage 30. The carriage 30 also has an upper surface 34, a front end 36 and a rear end 38. Attached by an attachment means to the upper surface 34 of the carriage 30 are the two counterbalanced weights 42, as shown in FIGS. 2, 3 and 4. These weights are made of a high-density material having a specific gravity of at least 0.5 Gm/Cm3. The weights are rotated in synchrony, either in a clockwise or counterclockwise direction by at least one electric motor 40. As shown in FIGS. 2, 3 and 4, attached to the base 14 are two stops 64 and 84 which may also contain a shock damping means.

In one design configuration, the means for attaching at least two of the counterbalanced weights 42 to the gears 94 and then to the upper surface 34 of the carriage 30 is accomplished, as shown in FIGS. 2, 3 and 4, by attaching the motor 40 and a second motor 44 to the upper surface 34 of the carriage 30. Gears 94 keep the weights in a proper relationship to each other. The two motors 40 and 44 are synchronized to rotate in opposite directions which allow the pair of weights 42 to maintain a relationship which cancels their lateral forces.

Figure 14:
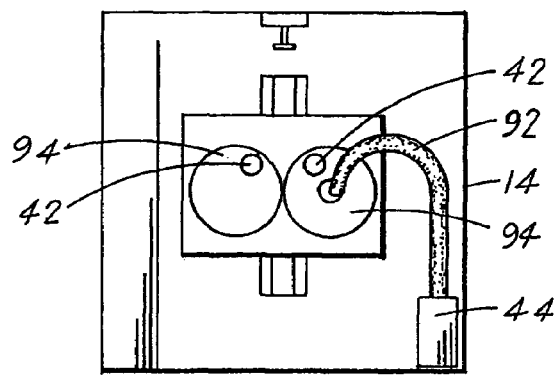
FIG. 14 is a schematic diagram of a weight driving means mounted to the base with a flexible shaft.

In whichever design configuration is utilized the motors 40 and 44 are operated by a power source 46. This power source may consist of a rechargeable battery 48 as shown in FIG. 6, a nuclear battery 50, as shown in FIG. 7; an array of photovoltaic cells 52, as shown in FIG. 8; or a combination of the above power sources or a fuel burning combustion engine 54 as shown in FIG. 9. The motor 40 can also be mounted on the base 14 and a flexible or movable shaft can couple energy to the weights 42 via gears 94, as shown in FIG. 14. The propulsion unit, as shown in FIG. 2 can be rotated on the payload platform 90, as shown in FIG. 15 to reverse the direction of travel of the payload platform.

Figure 15:
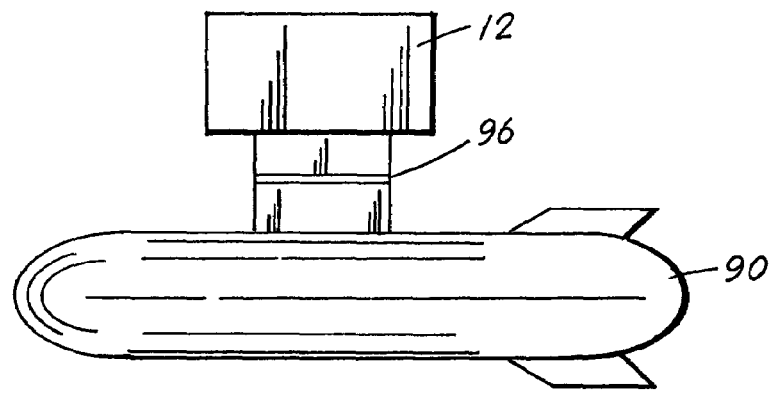
FIG. 15 is a schematic diagram showing the propulsion system with a means for reversing the systems direction of travel.
Figure 16:
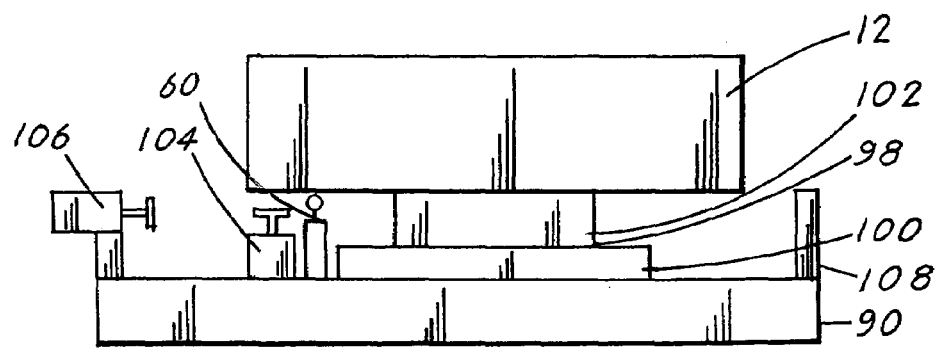
FIG. 16 is a side elevational view of the propulsion unit mounted on a second carriage constraining means that allows the propulsion unit to operate in the mode 2.

The second major element of the propulsion system, as shown in FIGS. 1, 15 and 16, is the payload platform 90 that can consist of any vehicle to be propelled. As previously stated, the propulsion system can be designed to operate in either a: mode 1 or a mode 2 operating cycle or a combination of both.

Figure 12:
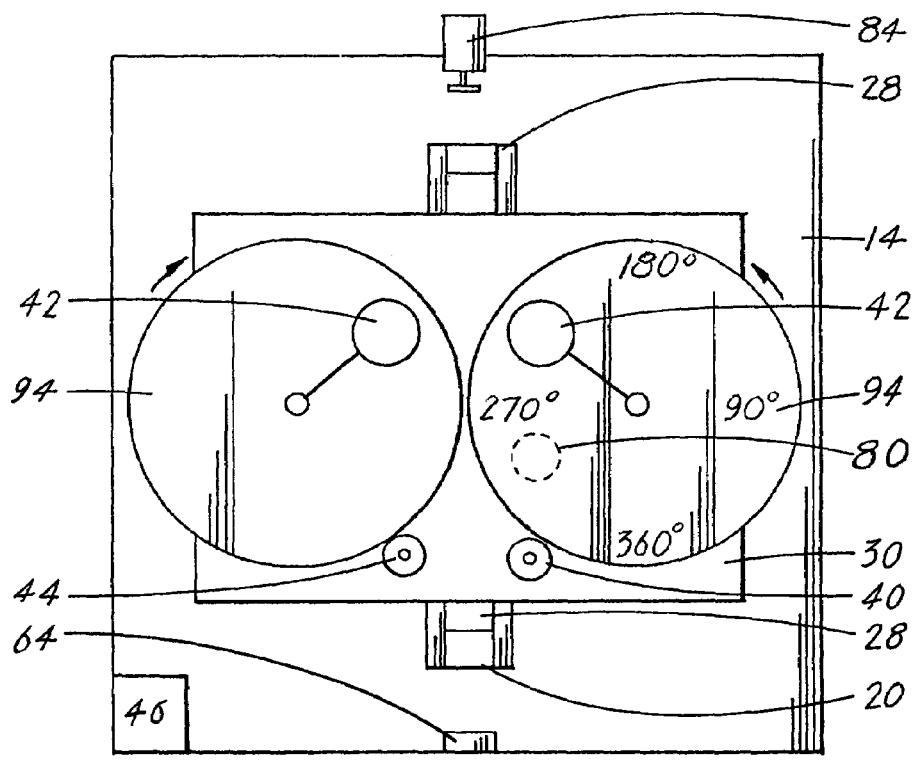
FIG. 12 is a top plan view of FIG. 11.
Figure 13:
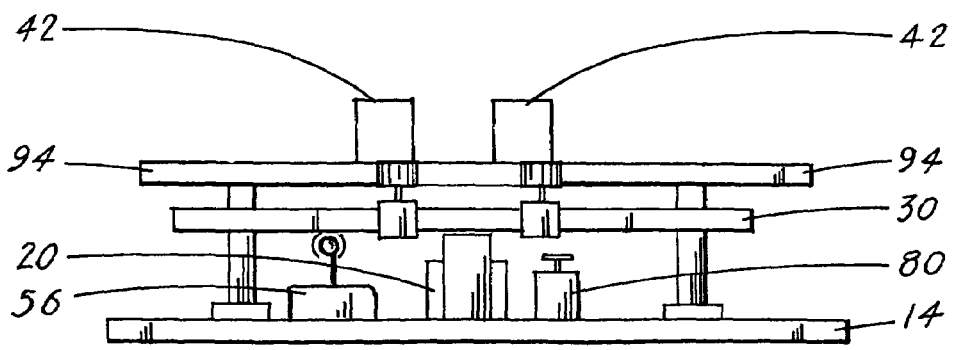
FIG. 13 is an end view of FIG. 11.
Figure 17:
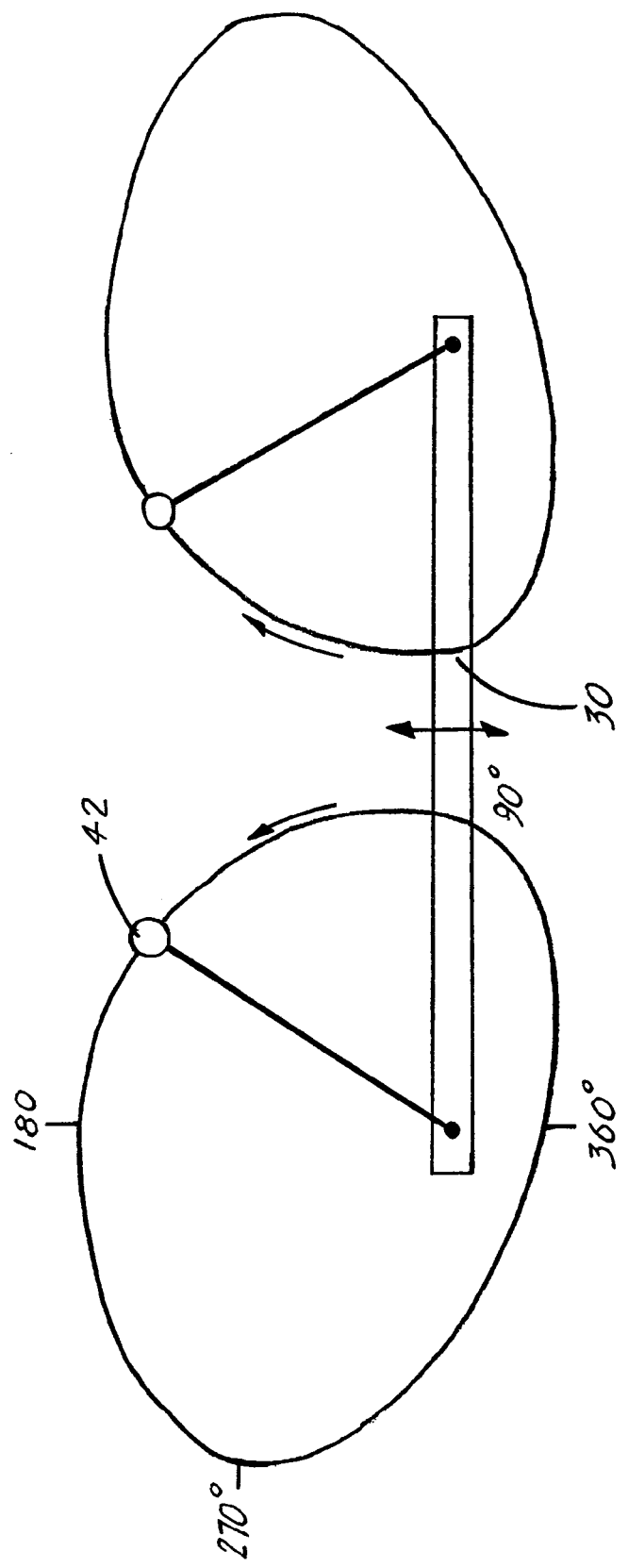
FIG. 17 is a view of the weight path in the mode 2 operation.

FIG. 12 will be used to explain the operation of the mode 1 operation. Remember that the forward or power cycle of the mode 1 operation is from 90–180 degrees, and the rest of the rotation of the weights are the reset to initial conditions, as shown in FIGS. 10 and 17. The mode 1 weight paths, are shown in FIG. 10, and in conjunction with FIG. 12, explain the operating sequence of mode 1. The weights 42 are shown in FIG. 12 to be about the 235 degree position. The weights are shown in the 45 degree position in locked to the base 14. There is no motion of the carriage 30 in relation to the base 14 because they are locked together by the solenoid 80. This is the forward or power segment of operation of mode 1.

As the weights travel from 180 to 270 degrees, note that the carriage motion is similar to when the weights travel from 270–360 degrees. When the weights are at 360 degrees the carriage 30 is at its most rearward position. At this position the carriage 30 must reverse direction and stop momentarily. This action reduces the kinetic energy of the carriage to zero. The weights however are rotating with same kinetic energy. The momentary change of mass or kinetic energy permits the weights to travel or escape to a more tangential path to their normal path. In other words, the kinetic energy of the weights is now able to drag the carriage 30 a greater distance than normal for that segment of operation (360–90 deg.). Notice that the carriage 30 has traveled twice the distance forward in just 90 degrees of rotation. This fact enables the propulsion system to reset itself to initial conditions and keep repeating the forward motion of the whole system as long as power is supplied. The speed of the motors 44 and 40 can be varied to change the velocity of motion of the system 90. It has proved sometimes advantageous to slow the motor speed as the weights 42 approach the 90 degree point in order to reduce the coupling shock of the carriage 30 as it locks to the base 14 when solenoid 80 engages.

If the reference position of the carriage 30 is lost in relation to the base 14 due to friction or misalignment over time a servo mechanism 56, as shown on FIG. 2, re-positions the carriage 30 on the slide base 20 so the unit will not run into the stops 64 or 84 The mode 2 operation can be best understood with the help of FIGS. 3, 10, 12 and 17. The second mode of operation utilizes all of the operations of mode 1. The mode 2 operating system enables a payload platform, as shown in FIG. 15, to be accelerated an increment of velocity during each cycle in which the mode 2 components of the system are engaged. These incremental acceleration steps are additive and thus the payload platform 90 can reach great velocities. FIG. 15 shows a means 96 to rotate or reverse the action of the propulsion system on the payload platform 90.

The method of accelerating the payload platform 90 is as follows. The proper timing is determined by a weight position sensor 72. This action couples the carriage 30 and the weights to the base 14. The momentum of the carriage 30 and the weights 42 are thus transferred to the base 14 and accelerate the base. The base is coupled to the payload platform during this time by a solenoid 104 that is fixed to the payload 90, thus resulting in the acceleration of the payload platform 90.

FIG. 16 shows the propulsion system 12 mounted on a upper movable slide 102 that is part of the linear slide 98. The lower portion of the constraining assembly 100 is mounted to the payload platform 90. The solenoid 104 enables the propulsion system 12 to be directly coupled to the platform 90. End stops with dampers 106 and 108 are utilized to keep the upper movable slide 102 confined. A servo mechanism 60 keeps the propulsion system 12 positioned on the lower stationary section 100 if the reference position of the propulsion system 12 is lost to the payload platform 90.

While the invention has been described in complete detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

The method of accelerating the payload platform 90 is as follows. The proper timing is determined by a weight position sensor 72. This action couples the carriage 30 and the weights to the base 14. The momentum of the carriage 30 and the weights 42 are thus transferred to the base 14 and accelerate the base. The base is coupled to the payload platform during this time by a solenoid 104 that is fixed to the payload 90, thus resulting in the acceleration of the payload platform 90.

FIG. 16 shows the propulsion system 12 mounted on a upper movable slide 102 that is part of the linear slide 98. The lower portion of the constraining assembly 100 is mounted to the payload platform 90. The solenoid 104 enables the propulsion system 12 to be directly coupled to the platform 90. End stops with dampers 106 and 108 are utilized to keep the upper movable slide 102 confined. A servo mechanism 60 keeps the propulsion system 12 positioned on the lower stationary section 100 if the reference position of the propulsion system 12 is lost to the payload platform 90.

While the invention has been described in complete detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

What is claimed is:

1. A propulsion system comprising:
   A. A propulsion unit comprising:
      a) a base having an upper surface and a lower surface,
      b) a carriage constraining assembly having an upper movable section and a lower stationary section, wherein the stationary section is rigidly attached to the upper surface of said base,
      c) a carriage having an upper surface, a lower surface, a front end and a rear end, wherein the lower surface is rigidly attached to the upper movable section of said carriage constraining assembly,
      d) at least two counterbalanced weights attached to the upper or lower surface of said carriage by an attachment means, wherein said weights are rotated in synchrony and in opposite directions by at least one weight driving means which is attached to said base or said carriage and is coupled to a power source by a coupling means,
      e) a carriage to base locking means is activated by a sensor,
      f) when said weights rotate from 130 degrees to 50 degrees said base moves in the opposite direction which is the desired direction of travel, the said locking means is activated during this time,
      g) said weights travel a path that enables them to return to their initial position in relation to said base,
      f) a forward stop and a rearward stop attached to said base positioned in relation to the ends of said carriage,
   B. a payload platform rigidly attached to said base, wherein said propulsion system is operated in a mode 1 operating cycle as follows:
      a) initially said propulsion system is stopped with no forward momentum, and said weights rotate from 130 degrees to 50 degrees,
      b) the mode 1 operating cycle commences when said power source is energized said propulsion system causing said weights to rotate in a non circular path in relation to said base which causes said base and payload platform to move forward as a ratio of said base and payload platform weight to the weight of the said weights, wherein the forward motion of said payload platform and base continues until said weights attain their maximum rearward travel which occurs at 180 degrees, at which time the forward motion of said payload platform stops, and
      c) said weights continue to rotate in a non-proportional weight to carriage travel distance from 180 degrees past 360 degrees to 130 to 50 degrees, at which time said weights have attained their initial position, and at 180 degrees in the mode 1 operating cycle, said carriage is decoupled from said base.

2. The propulsion system as specified in claim 1 wherein said carriage constraining assembly is comprised of a magnetically levitating constraining assembly.

3. The propulsion system as specified in claim 1 wherein said coupling means comprises a movable shaft.

4. The propulsion system as specified in claim 1 wherein said weight driving means comprises an electric motor.

5. The propulsion system in claim 1 wherein said power source comprises a rechargeable battery.

6. The propulsion system as specified in claim 1 wherein said power source comprises a nuclear battery.

7. The propulsion system as specified in claim 1 wherein said power source comprises an array of photovoltaic cells.

8. The propulsion system as specified in claim 1 wherein said weights are made of a high-density material having a specific gravity of at least 0.5 Gm/C.3 and that can be rotated either in a clockwise or counterclockwise direction.

9. The propulsion system as specified in claim 1 wherein said means for rotatably attaching the at least two counterbalanced weights to the upper surface of said carriage comprise a first motor attached to the upper or lower surface of a carriage and that is synchronized with a second motor to rotate in an opposite direction from said first motor which allows said weights to maintain a relationship that cancels the weight's lateral forces.

10. The propulsion system as specified in claim 1 further comprising the carriage to base locking means for locking said carriage to said base.

11. The propulsion system as specified in claim 10 wherein said carriage to base locking means comprises an electric solenoid that is activated by said power source.

12. The propulsion system as specified in claim 1 further comprising:
   a) a second carriage constraining assembly having an upper movable section and a lower stationary section, wherein the upper movable section is rigidly attached to the lower surface of said base and the lower stationary section is attached to said payload platform,
   b) a second locking means for locking and unlocking said base to said payload platform during rotation of said weights, thus enabling said base to be coupled to the payload platform at appropriate times during the mode 1 operation,
   c) an external front stop which includes a damping means and an external rear stop attached to said payload platform and positioned in alignment with said front and rear stops, wherein the addition of the second carriage constraining assembly and said external front and rear stops, said propulsion system is operated in a mode 2 operation cycle as follows:
      (1) initially said propulsion system is stopped and said weights are at 130 to 50,
      (2) the mode 2 operation commences when said power source energizes said propulsion system causing the weights to rotate in a non-circular path in relation to said base, thereby allowing the propulsion system to move forward, said carriage and said weights are coupled via the carriage to base locking means and the second locking means that locks the said propulsion system to said payload platform, this action causes the payload platform to move forward because some of the kinetic energy of the said propulsion system has been coupled or transferred to the said payload platform, the said propulsion system initializes back to initial conditions thus permitting the operation of the said propulsion system to again repeat with an additional increment of velocity imparted to the payload platform, these additions of velocity are additive, and
   d) the said mode 1 and mode 2 are operated simultaneously or alternately to restore the said propulsion system location in relation to the said payload platform.

13. The propulsion system as specified in claim 1 further comprising a means of rotating said propulsion system 180 degrees for other functions such as slowing down the said payload platform.

14. The propulsion system as specified in claim 1 wherein multiple propulsion systems are attached to said payload platform.

* * * * *